Sept. 3, 1929.  R. H. FLOYD  1,727,009
SLACK TAKE-UP DEVICE
Filed Feb. 14, 1927  3 Sheets-Sheet 1
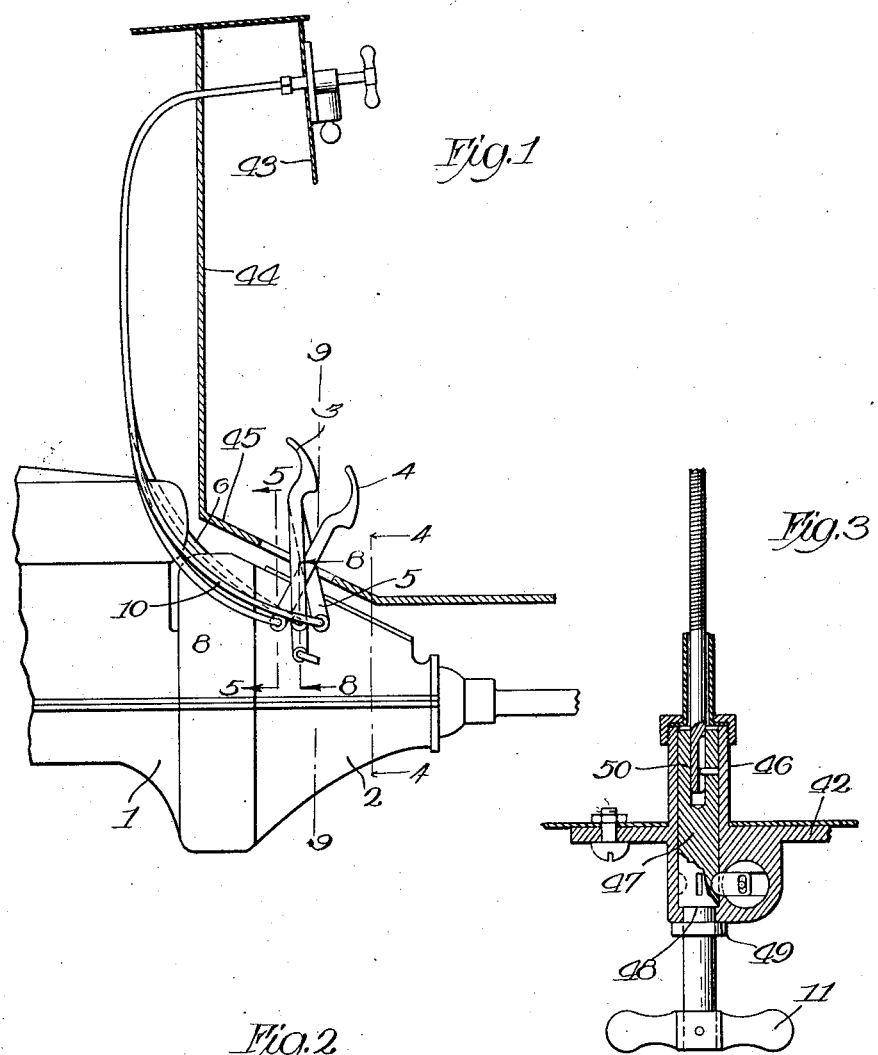
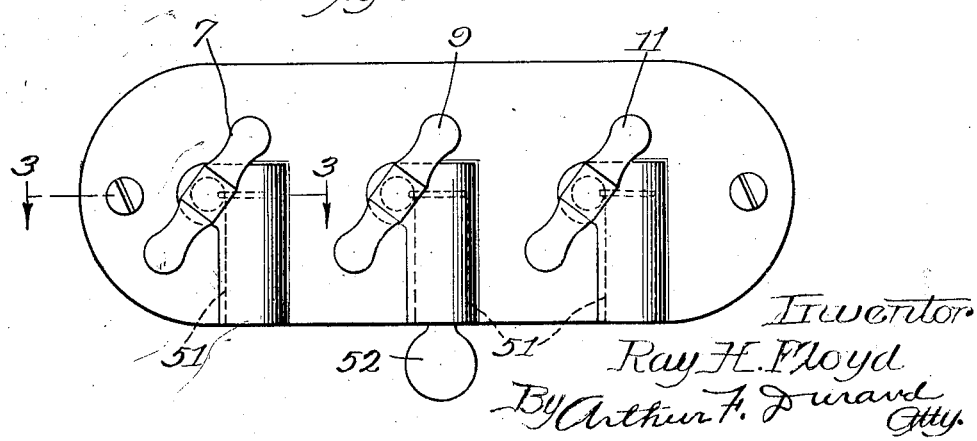

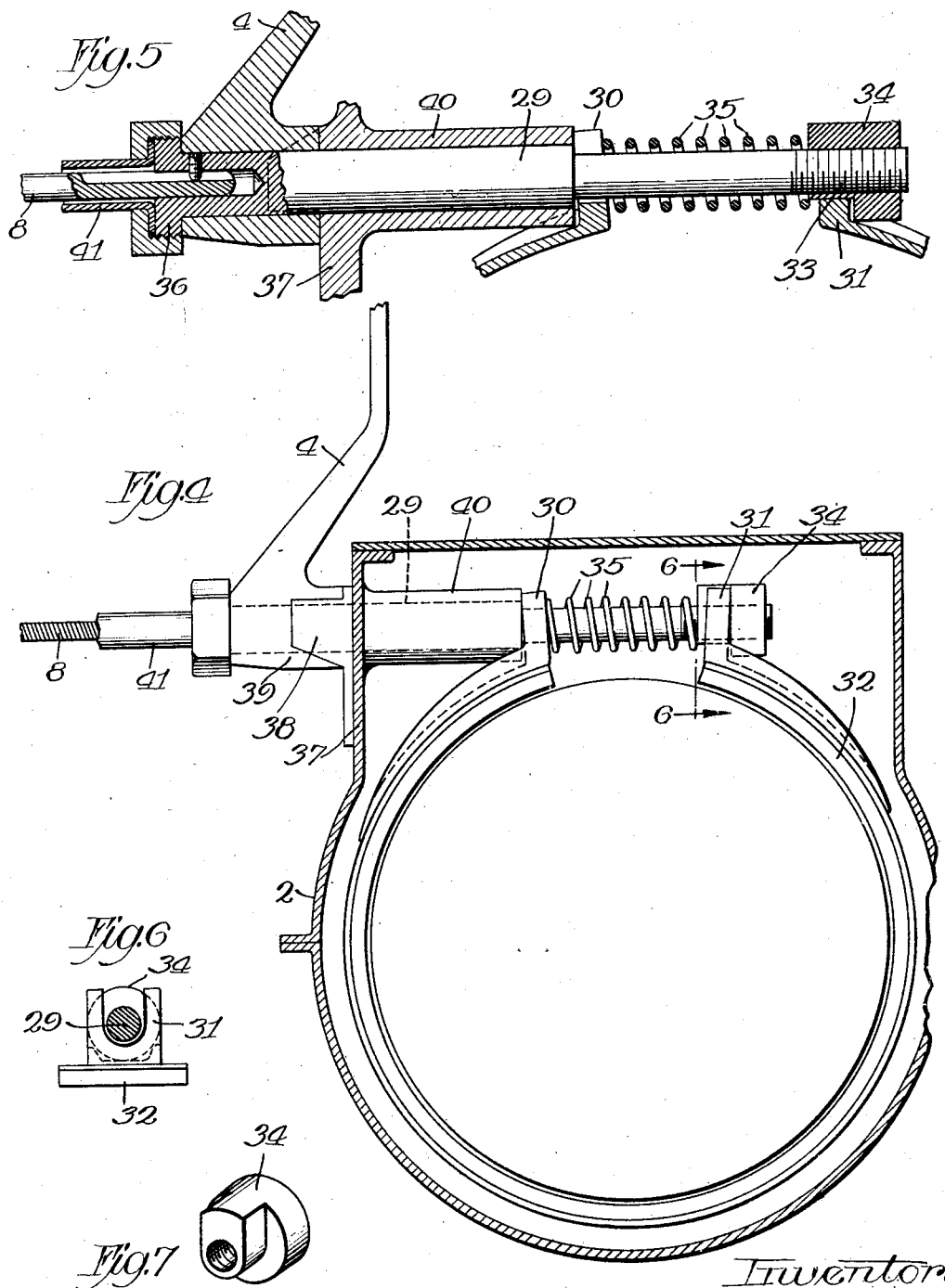

Sept. 3, 1929.   R. H. FLOYD   1,727,009
SLACK TAKE-UP DEVICE
Filed Feb. 14, 1927   3 Sheets-Sheet 3
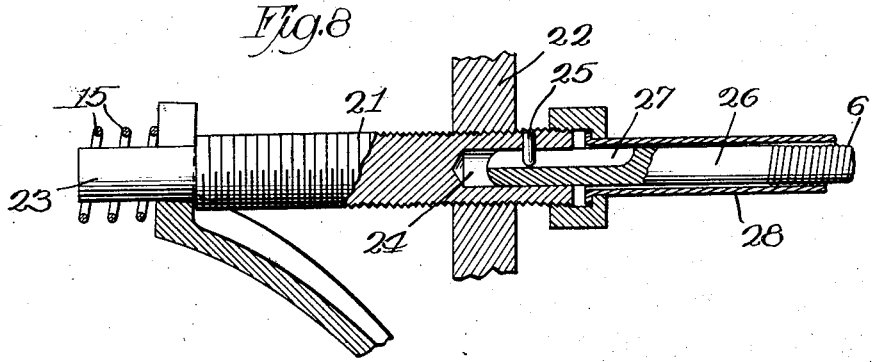
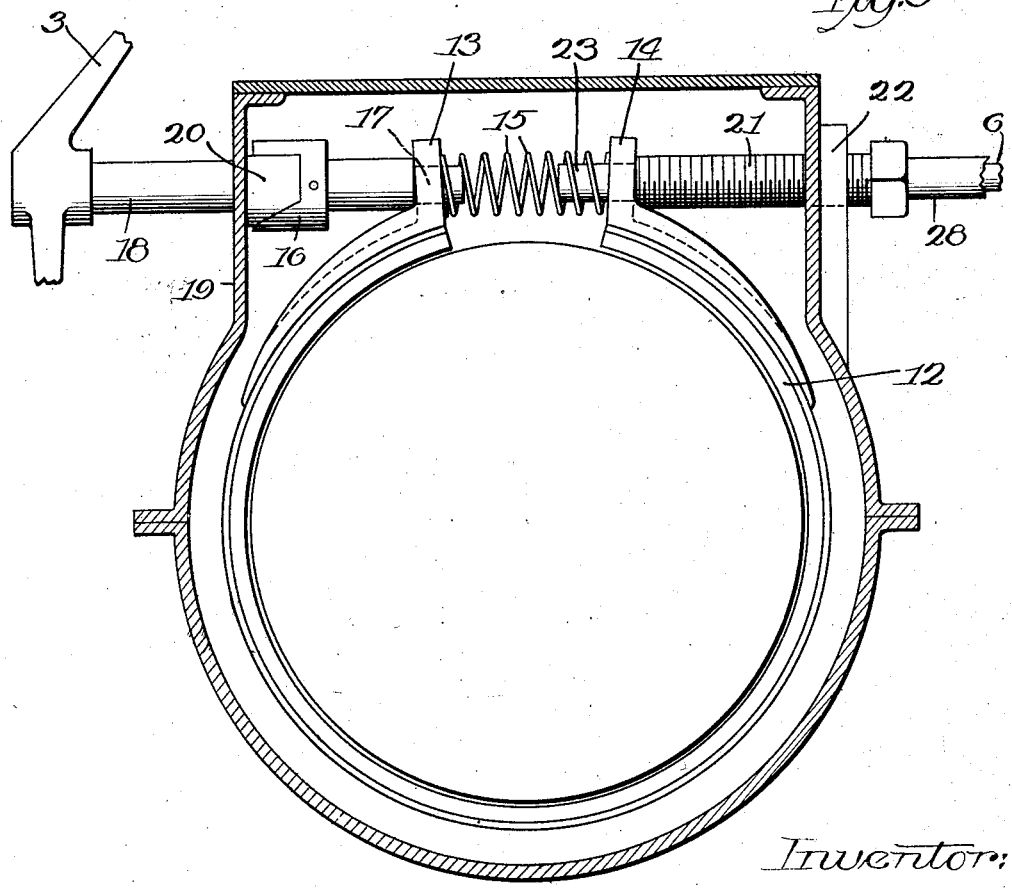

Patented Sept. 3, 1929.

1,727,009

UNITED STATES PATENT OFFICE.

RAY H. FLOYD, OF CHICAGO, ILLINOIS, ASSIGNOR TO UNIQUE SPARK PLUG CLEANER CO., OF CHICAGO, ILLINOIS, A CORPORATION OF ILLINOIS.

SLACK-TAKE-UP DEVICE.

Application filed February 14, 1927. Serial No. 168,175.

This invention relates to vehicle brakes and more particularly to means for mechanically adjusting or tightening the brakes, when necessary or desirable, by means within reach of the driver, so that the brakes can be conveniently adjusted at will.

Generally stated, the object of the invention is to provide a novel and improved construction whereby a vehicle brake, and more particularly a motor vehicle brake, may be tightened or adjusted mechanically, by means of a controller mounted within reach of the driver, preferably on the dash of the vehicle.

Another object is to provide a novel and improved construction whereby the engine brake of a Ford car, or of a similar motor vehicle, may be adjusted mechanically, at will, by means of a controller within easy reach of the driver.

Another object is to provide an improved construction and arrangement whereby all three of the brake bands of the engine of a Ford car, or of a similar motor vehicle, may be tightened or adjusted at will, through the medium of mechanical connections extending from the brake bands to three controllers mounted in a convenient position for operation by the driver, preferably on the dash of the vehicle.

It is also an object to provide certain details and features of construction and novel combinations tending to increase the general efficiency and desirability of a vehicle brake mechanical adjusting mechanism of this particular character.

To these and other useful ends the invention consists in matters hereinafter set forth and claimed and shown in the accompanying drawings in which—

Fig. 1 is a side elevation of the rear portion of a Ford car engine, or engine of similar character, showing the dash and foot board portions of the body in vertical, longitudinal section, and showing the brake mechanism of the said engine equipped with tightening or adjusting mechanism involving the principles of the invention.

Fig. 2 is an enlarged front elevation of the controller means shown in Fig. 1 mounted on the dash in front of the driver.

Fig. 3 is a section on line 3—3 in Fig. 2.

Fig. 4 is an enlarged cross section of the brake mechanism on line 4—4 in Fig. 1.

Fig. 5 is an enlarged cross section of certain portions of said mechanism on line 5—5 in Fig. 1.

Fig. 6 is a detailed section on line 6—6 in Fig. 4.

Fig. 7 is a perspective of one of the parts.

Fig. 8 is an enlarged section on line 8—8 in Fig. 1.

Fig. 9 is an enlarged section on line 9—9 in Fig. 1.

As thus illustrated, and referring to Fig. 1 of the drawings, the engine 1 has the rear housing 2 thereof adapted to contain the three brake bands for the three pedals 3, 4 and 5 which are provided as usual in a car of the Ford type, or similar type, to control the high and low speeds, the reverse, and the regular foot brake in the well known manner.

The pedal 3 is connected by rotary shaft 6 with the left hand controller 7 on the dash of the vehicle, while the pedal 4 is connected by a similar rotary flexible shaft 8 with the rotary controller 9 on the dash, and the pedal 5 is connected by a similar flexible rotary shaft 10 with the third controller 11 on the dash of the vehicle.

The mechanism whereby the rotation of the handle 7 will tighten or adjust the brake band 12 of the pedal 3 is as follows:

Referring to Figs. 8 and 9, it will be seen that the two end portions 13 and 14 of the brake band are pressed apart by a coil spring 15, and that a rotary cam element 16 is journaled at 17 in the end portion 13 of the brake band as shown. The pedal 3 is rigid with the shaft 18 which is journaled in the housing 19 and provided on its inner end with the cam portion 20 for engagement with the cam portion 16 previously mentioned. The screw threaded portion 21 has screw engagement with the portion 22 of the housing, and has a reduced portion 23 which is journaled in the end portion 14 of the brake band. This portion 21 is provided with an axial bore 24 and has a transverse pin 25 extending into this bore. The flexible shaft 6 has its end portion 26 provided with a longitudinal groove 27 to engage said pin, as shown in Fig. 8 of the drawings, and the shaft 6 has a tubular casing 28 suitably coupled to the end of the portion 21 as shown. With this arrangement, operation of the brake pedal 3 will cause the cam portions 16 and 20 to co-act in a manner to cause endwise pressure against the portion 13 of the brake band, causing contraction of the brake band upon the brake drum. If the band is not tight enough, a rotation of the shaft 6 by means of the controller 7 will rotate the screw threaded portion 21 in the stationary threaded portion 22, causing endwise pressure against the end portion 14 of the brake band, thus tightening the band in a manner that will be readily understood.

For the pedals 4 and 5, the brake band tightening mechanism is of the kind shown in Figs. 4 to 7 of the drawings, in which it will be seen that the rod 29 connects the two end portions 30 and 31 of the brake band 32 together in the manner shown, the reduced end portion 33 of this rod being threaded and provided with a nut 34 held against rotation by the formation and engagement therewith of the end portion 31 of the brake band. A coil spring 35 surrounds the reduced portion of the rod, between the two end portions of the brake band, as shown, to release the brake band from the drum. The pedal 4 is rotatable on the rod 29 and is held thereon by the threaded head 36 of said rod. The casing portion 37 has a cam portion 38 rigid therewith to engage the cam portion 39 of said pedal, whereby actuation of the pedal will cause the two cam portions to co-act in a manner to exert an endwise pull on the rod 29, and as the portion 30 of the brake band is held stationary against the sleeve 40, this pull is exerted upon the end portion 31 of the brake band, causing a tightening of the band on the brake drum. The flexible shaft 8, it will be seen, is coupled to the rod 29 in the manner shown in Fig. 5, in the manner previously explained in connection with Fig. 8 of the drawings, whereby rotation of this shaft 8 by the controller handle 9 will cause rotation of the rod 29 and this will cause the screw threaded portions 33 and 34 to co-act in a manner to move the portion 34 to the left on said threaded portion of the rod, thus moving the end portion 31 of the brake band toward the end portion 30 and thereby tightening the brake band of the drum. A tubular casing 41 encloses the shaft 8 in the manner shown, and is coupled to the head 36 in a manner similar to that shown and described in connection with Fig. 8 of the drawings.

The brake adjusting mechanism for the foot pedal 5 is similar to that shown in Figs. 4, 5, 6 and 7 of the drawings, and is controlled by the rotary controller handle 11 in the same manner to tighten the brake drum of this particular pedal.

It will be seen that all three controllers 7, 9 and 11 are mounted by a plate 42 on the dash 43 of the vehicle, and that the three flexible shafts 6, 8 and 10 extend through the wall 44 of the dash and downward in front thereof and then under the foot board 45 of the vehicle to the brake band adjusting means of the three different pedals. The three flexible shafts are each connected to their respective controller handles in the manner shown in Fig. 3 of the drawings, the plate 42 having three tubular parallel forward extensions 46 to the ends of which the tubular casings of the three flexible shafts are coupled in the manner shown, whereby the three tubular casings can be uncoupled at their opposite ends when such is necessary or desirable. It will also be seen, from Fig. 3 of the drawings, that each controller has a rotary stem portion 47 journaled in the plate 42 in the manner shown, and held against endwise axial displacement by the inside shoulder 48 and outside collar 49 of each controller stem. Each stem 47 has a longitudinal bore 50 which receives the end portion of the flexible shaft in the manner shown and described in connection with Fig. 8 of the drawings. Thus each end of each flexible shaft is coupled for compensating or endwise relative self-adjustment to suit the requirements of the construction shown and described. Each controller has a locking device 51 of any suitable or desired character, adapted to engage the controller stems, to lock the controllers against motion, after the brake bands are properly adjusted. A key 52 is insertable in the lower end of each locking device to lock and unlock the controller allotted thereto.

As thus illustrated, it will be seen that mechanical means are provided for tightening or adjusting the brake or brakes of a motor vehicle, by one or more controllers arranged within convenient reach of the driver, so that the adjustment is entirely mechanical, but at the same time controllable by the driver without stopping the car. By merely removing one hand from the steering wheel of the car, the driver can reach forward and mechanically tighten or adjust the vehicle brake without stopping the car and without the necessity of using a screw driver or wrench or other tool for this purpose. The brake adjusting means can be employed as a means for preventing theft or unauthorized use of the vehicle, as the brakes can be left fully tightened and with the controllers locked in such adjustment, the car cannot be started.

Thus means are provided for tightening or loosening the brakes of a motor vehicle, by strictly mechanical control exerted from the dash.

Without disclaiming anything, and without prejudice to any novelty disclosed, what I claim as my invention is:

1. In vehicle brake adjusting mechanism, the combination of a brake, mechanical tightening or adjusting devices on said brake having an externally screw threaded rotary member, internally screw threaded means engaging said member and cooperating therewith to cause a tightening or loosening of the brake band by rotation of said member, a controller for setting and releasing the brake without rotating said member, an adjustment controller operable by the driver while the vehicle is moving, means holding said adjustment controller stationary when the brake is operated, and mechanical power transmitting means between said member and said adjustment controller, whereby said adjustment controller is manually operable by the driver to mechanically tighten or loosen the brake at will.

2. A structure as specified in claim 1, said adjustment controller being rotatable and held against both axial and lateral movement, and said power transmitting means being rotatable by said adjustment controller and in turn operative to cause said rotation of said devices.

3. A structure as specified in claim 1, said power transmitting means comprising a flexible shaft extending through the dash and downward in front thereof and under the foot board of the vehicle body to said member.

4. A structure as specified in claim 1, said adjustment controller being mounted in a fixed bearing on the upper dash of the vehicle, whereby there is direct mechanical control from the dash to said devices.

5. A structure as specified in claim 1, said adjustment controller being mounted in a fixed bearing on the dash of the vehicle, whereby there is direct mechanical control from the dash to said devices, and said adjustment controller having a handle whereby it is operable by hand without the use of tools to exert direct mechanical control of said devices, which devices are disposed below the foot board of the vehicle body.

6. A structure as specified in claim 1, said brake having a brake band provided with end portions, the axis of said rotary screw threaded member extending across from one to the other of said end portions.

7. In brake mechanism, brake bands disposed under the foot board of the body of the vehicle, a foot pedal for each brake band, means whereby each foot pedal is operative to control its allotted brake band, to set the brakes at will, a rotary adjustment controller for each brake band, means holding each adjustment controller stationary when the foot pedal is operated, serving to prevent either axial or lateral movement of each controller, adjusting devices for each brake band, and controlling connection between each adjustment controller and the said devices of its allotted brake band, whereby each brake band is susceptible of tightening or loosening by the driver from the dash of the vehicle.

Specification signed this 11th day of Feb., 1927.

RAY H. FLOYD.